Dec. 14, 1926. 1,611,066
E. S. PRESTON
COMBINATION TAIL AND STOP LIGHT
Filed July 23, 1923   2 Sheets-Sheet 1
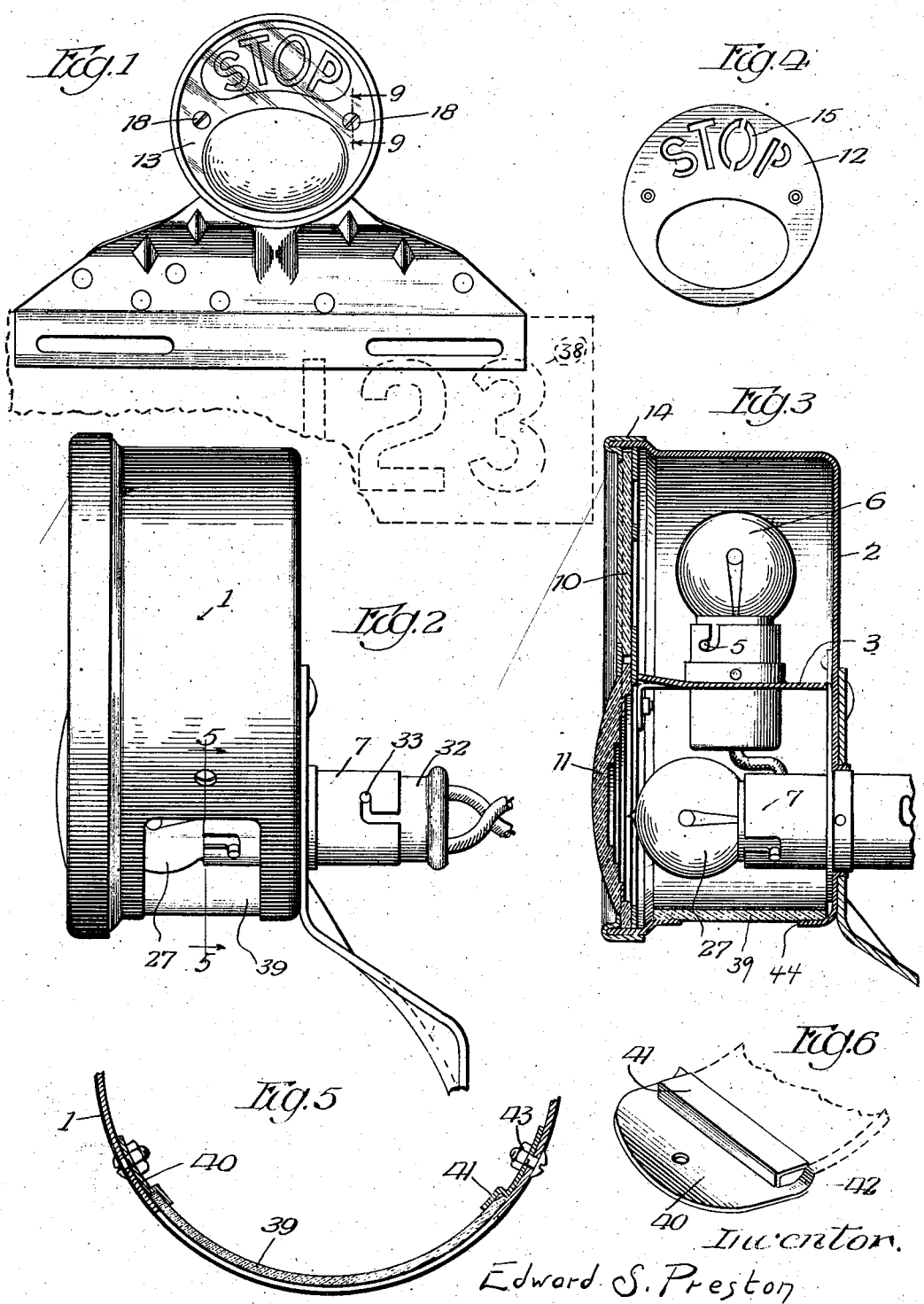

Dec. 14, 1926.
E. S. PRESTON
1,611,066
COMBINATION TAIL AND STOP LIGHT
Filed July 23, 1923   2 Sheets-Sheet 2
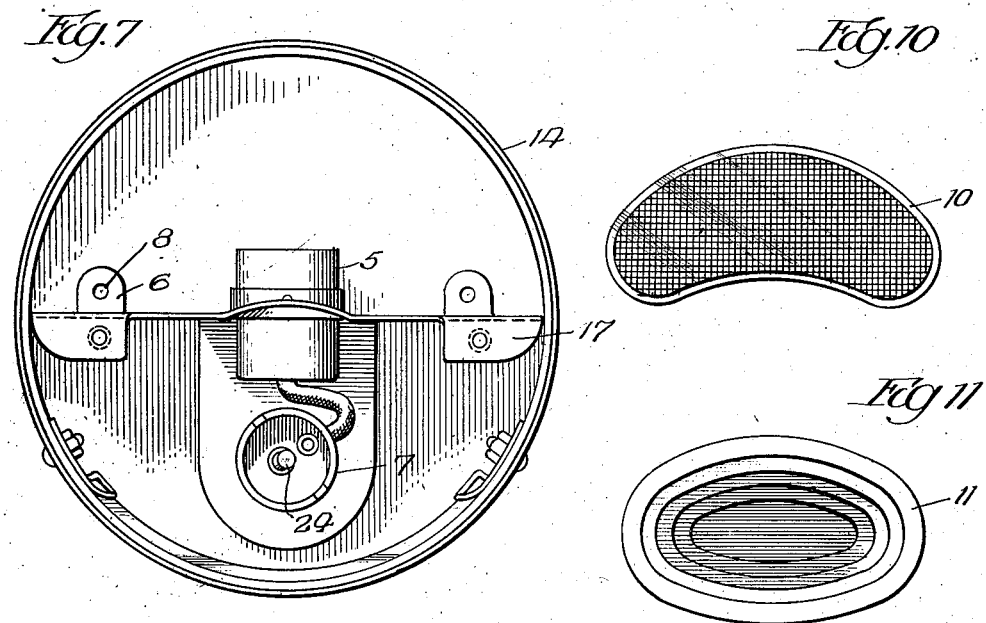
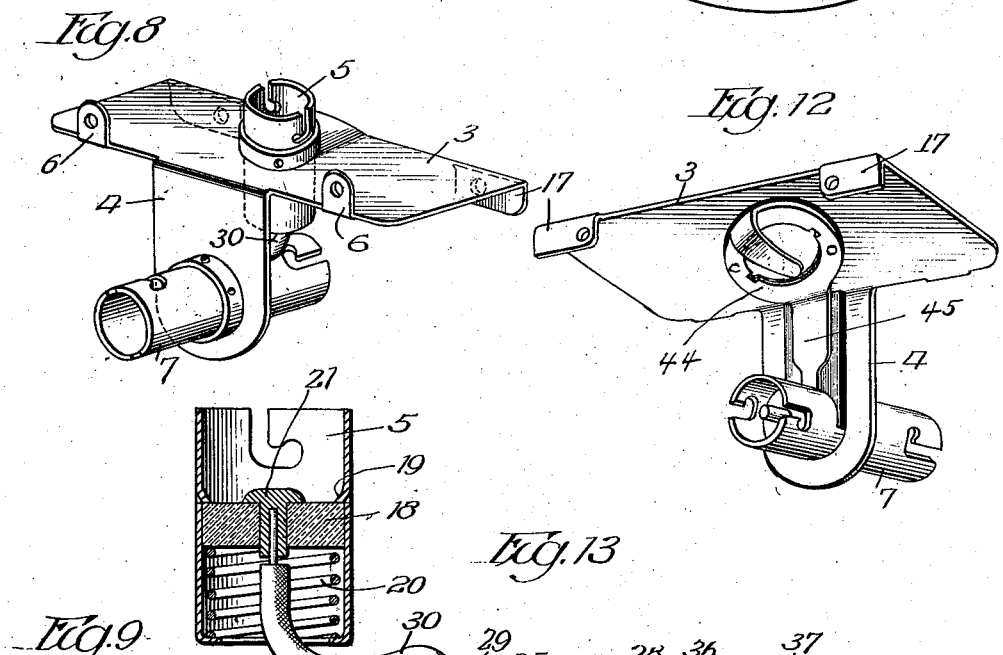
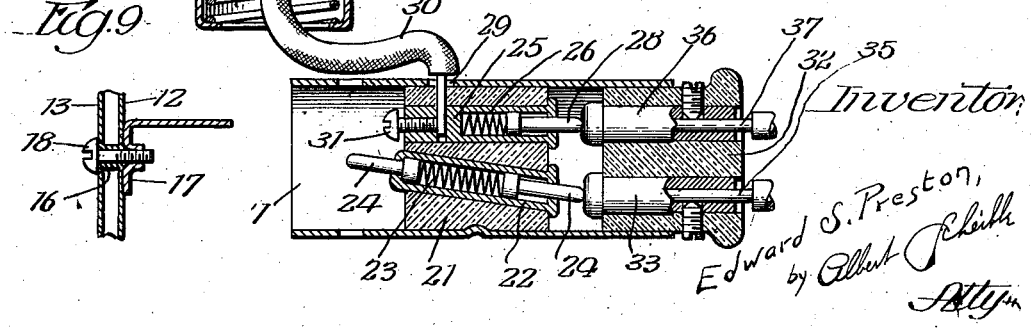

Patented Dec. 14, 1926.

1,611,066

UNITED STATES PATENT OFFICE.

EDWARD S. PRESTON, OF CHICAGO, ILLINOIS, ASSIGNOR, BY MESNE ASSIGNMENTS, TO CHICAGO ELECTRIC MANUFACTURING COMPANY, OF CHICAGO, ILLINOIS, A CORPORATION OF ILLINOIS.

COMBINATION TAIL AND STOP LIGHT.

Application filed July 23, 1923. Serial No. 653,105.

My invention relates to two-signal lamps and in some of its general objects aims to provide a compact, handsome, easily assembled and highly effective lamp construction applicable wherever two distinct sources of light are employed for affording distinct luminous indications.

In automobile practice it has proven highly desirable to equip the rear of the vehicle with a stop signal light operated by the setting of the brake, this light being independent of the usual tail light. Since illumination is also continuously needed at night for the rear license number plate, this can readily be secured from the lamp of the tail light and my invention aims to provide for this also, so that the three essential illuminations (namely those of the tail light, the rear license number plate and the intermittently illuminated stop-light) can all be secured in a compact and handsome lamp assembly.

More particularly, my invention provides a lamp construction for such purposes in which the same partitioning member which divides the lamp casing into compartments respectively housing the tail lamp and the stop-signal lamp also serves as a support for the two sockets required in connection with these lamps; in which the two sockets can be fastened to this partitioning member, so that the resulting assembly can be handled as a unit; in which this unit when secured to the lamp casing can then have the lamp front fastened to it so as to afford simple and effective means for holding the lamp front in position; in which the socket employed for the tail lamp also serves in connection with a suitable electric cross-connection for carrying current to the companion or stop-signal lamp socket; and in which the tail lamp socket affording this double function is adapted for use with an ordinary two-wire plug.

Furthermore, my invention provides a lamp for such purposes such as those above described, including a simple and effective fastening for the glass pane through which light issues towards the license plate. It also provides simple and effective means for holding the stop-signal glass and the tail light lens in their proper positions, and desirably employs a stencil plate for this purpose so that the entire lamp front (including a collar adapted to sleeve upon the mouth of the lamp casing, a front plate carrying the collar, a pair of glass lens elements and a stencil plate clamping these elements against the front plate) can be handled as a unit. Still further and also more detailed objects will appear from the following specification and from the accompanying drawings, in which—

Fig. 1 is an elevation of a combination vehicle lamp embodying my invention, taken from the rear of the vehicle (or the front of the lamp) and also showing a portion of an associated license plate in dotted lines.

Fig. 2 is an enlarged side elevation of the same lamp and of a portion of the supporting bracket, taken from the right hand side of Fig. 1.

Fig. 3 is a correspondingly enlarged central and vertical section through the same combination lamp.

Fig. 4 is an elevation of the stencil plate employed in the lamp.

Fig. 5 is a fragmentary transverse section through the lower portion of the lamp, taken along the line 5—5 of Fig. 2.

Fig. 6 is an enlarged perspective view of one of the clips which hold the bottom class in position.

Fig. 7 is a front view of the lamp, drawn on the same scale as Figs. 2 and 3, but showing this with the lamp front and the incandescent lamps removed.

Fig. 8 is a perspective view of the detachable unit comprising the partitioning member and the two interconnected lamp sockets.

Fig. 9 is an enlarged fragmentary section taken along the line 9—9 of Fig. 1 to show the fastening of the lamp front to the partitioning member forming a part of this unit.

Fig. 10 is a front elevation of the upper glass pane or lens and Fig. 11 is a rear elevation of the lower glass or tail lamp lens.

Fig. 12 is a perspective view of the unitary member consisting of the partitioning member and the interconnected lamp sockets, showing another construction of lamp sockets adapted for this purpose.

Fig. 13 is an enlarged sectional view showing the construction of the two lamp sockets of Figs. 3, 7 and 8 and the connection between the same.

In the embodiment of Figs. 1 to 12 inclusive, the lamp of my invention includes a casing which has a main cylindrical side 1 and a flat back 2, the said side being desirably enlarged in diameter adjacent to the front or mouth of the casing. Mounted within this casing is a partitioning member which desirably consists of a plate 3 extending longitudinally of the casing and having both a rear web 4 extending downwardly from it at its back and a pair of vertical wings 17 at its front, this partitioning member also having a pair of vertical attaching wings 6 at its back. Secured to this partitioning member are a pair of relatively transverse lamp sockets which are respectively mounted on the horizontal web 3 and the rear web 4, one of these sockets being here shown as having a shell 5 arranged for supporting a lamp 6 above the partition plate 3 and the other as having the socket shell 7 arranged for supporting the companion lamp 27 below the said partition plate. Both of these lamp sockets are desirably fastened permanently to the partitioning member so as to form a unit with the latter after the manner shown in Fig. 8, thereby permitting the resulting partition and socket assembly to be inserted into the casing and fastened within the same as a unit. After being thus inserted, the unit is secured in its normal position by rivets 8 extending through corresponding perforations in the rear ears 6, and when thus in position, the shell 7 of the lower socket desirably extends through a corresponding perforation in the back 2 of the casing as shown in Figs. 2 and 3.

For the corresponding lamp front, I desirably employ a pair of glass members 10 and 11 clamped between a stencil plate 12 and a front plate 13, both of the said plates having suitable openings therein, the front plate 13 having a rearwardly turned rim 14 sleeved upon the mouth end of the casing. The stencil plate 12 has suitable legend 15 punched therein so as to form the desired signal indication, such as the word "Stop", and the glass pane 10 in front of this lettering desirably has light refracting formations (such as those shown in Fig. 10) for avoiding an undue glare from the upper lamp 6 and for increasing the legibility of the lettering when this lamp is lighted. The lower glass lens 11 is desirably of a prismatically stepped type, both of the front glass members 10 and 11 being preferably made of glass of suitable coloring and each being preferably provided with a relatively thin flange affording a shoulder formation so that each of these glass members fits snugly into the corresponding opening in the glass front member 13.

After the said two glass members have their thin flange portions interposed between the stencil plate 12 and the front plate 13, the two plates are desirably secured permanently to each other by means of a pair of hollow rivets 16, each of which rivets is opposite a perforation in one of the ears 17 of the partitioning member, so that the entire lamp front (consisting of the said plates 12 and 13 and the glass members 10 and 11) can be handled as a unit. This front is then attached to the ears 17 on the partitioning member by means of screws 18 threaded into the perforations in these ears.

To facilitate the connecting of two separately controlled circuits to the two lamps, I desirably employ two circuits, each of which has one side grounded to the metal work of the automobile and hence to the casing of the lamp and through the partitioning member to the shells of both sockets. This permits my using socalled single pole sockets, such as the vertically disposed upper socket shown in Fig. 9 as having a shell 5 in which an insulating washer 18 is slidable, this washer being adapted to be pressed upwardly against stop lugs 19 by a compression spring 20 interposed between the washer and an annular shoulder formed by contracting the lower end of the socket shell. Mounted in the bore of the insulating washer 18 is a contact member 21 which engages the axial lamp contact in the manner customary with socalled single pole lamp sockets and which is connected to one of the circuits.

To secure the circuit connections for both sockets without requiring the user of the lamps to do any wiring, I desirably construct the lower lamp socket so that it will not only carry current from one circuit to the lower lamp 27, but will also carry current from the other circuit to the contact member 21. For this purpose, I am showing the shell 7 of the lower and horizontally disposed socket as having mounted in it an insulating body 51 which has two cylinders extending lengthwise through the same. One of these cylinders, shown as 22 in Fig. 10, houses a compressing spring 23 which urges a contact plunger 24 forwardly towards the lamp 27 associated with that socket shell and which also urges another plunger 24 rearwardly. The other cylinder 25 houses a compression spring 26 urging a plunger 28 rearwardly of the shell and the cylinder 25 has a transverse bore disposed opposite an aperture 29 in the socket shell. This aperture permits one end of a wire 30 to enter the lower socket and to be fastened to the cylinder 25 by a screw 31, while the other end of the said wire is soldered into a suitable bore in the contact member 21.

While the forward plunger 24 in the said lower socket desirably presents its forward or free end substantially at the axis of the socket shell, this plunger and the cylinder 22 housing the same desirably extend at an angle of the socket so that the rear plungers 24 and 28 will be suitably spaced. By so doing, I can readily bring these plungers respectively opposite two circuit terminals carried by a common type of detachable insulating plug 32, this plug having the customary lateral pins 33 for engaging the usual bayonet slots in the socket shell 7 adjacent to the rear end of the latter. Since this rear end projects back of the lamp casing as shown in Fig. 2, the circuit connections can instantly be made to both lamps by simply attaching a plug carrying terminals for wires of the two circuits. For this purpose, Fig. 13 shows such a plug as having a circuit terminal 33 disposed for contacting with the rear plunger 24, this terminal having one circuit wire 35 secured to the same, and also shows a companion terminal 36 disposed opposite the rear plunger 38 and secured to the other circuit wire 37.

To adapt my combination lamp also for illuminating an adjacent license number plate, such as the one shown in dotted lines at 38 in Fig. 1, I provide an elongated opening 44 in the casing, extending part way around the wall of the casing at the bottom thereof. Then I cover this aperture by a correspondingly curved glass pane 39 disposed within the casing and of greater width and length than the said aperture. This pane 39 abuts at each end against a shoulder formed in a tongue 41 bent from a metal clip 40 secured to the casing by a bolt 43, the tongue having its end portion overhanging the inner face of the pane to clamp the latter to the casing. Each metal clip 40 also has a pair of fingers 42 formed from it and extending alongside the edges of the pane (as shown in Fig. 6) so as to prevent this pane from sliding lengthwise of the casing.

With the parts thus arranged, it will be obvious from the drawings that I secure an unusually compact and effective but simple construction; that the two clips 40 hold the curved glass bottom pane securely in position but can readily be detached to permit a replacing of this pane in case it should be broken; that by loosening the screws 18 the entire lamp front can readily be detached, thereby affording access to the entire interior of the casing; that the initial assembling of the partition and socket unit simplifies and facilitates the manufacture of the lamp as a whole and the proper alining of its parts; and that the needed circuit connections for both lamps can readily be made by the mere attaching of an ordinary two-wire plug to the rearwardly projecting socket shell 7. So also, the desired signal indication for the upper light can readily be varied by merely substituting a stencil plate bearing a correspondingly different legend, while the color effects can be varied by using correspondingly different colored glass for the glass members of the lamp front.

In practice, the entire interior of the casing as well as the surfaces of the partitioning member and of the two socket shells are desirably of a high light reflecting character, so as to increase the efficient use of the light of the two incandescent lamps. However, I do not wish to be limited as to this nor as to other details of the construction and arrangement here disclosed, as many changes might obviously be made without departing either from the spirit of my invention or from the appended claims. For example, the entirely housed upper lamp socket might have its conducting and lamp-contacting member 45 formed integral with a conductor 44 which extends into the other socket and serves as a substitute for the wire 30 of Fig. 13, as more fully disclosed in my copending application #653,106, filed July 23, 1923 and entitled Interconnected lamp-sockets.

So also, I do not wish to be limited to the use of my invention in connection with automobiles or other vehicles, as its novel features might obviously be employed also in multi-light lamps designed for other purposes.

I claim as my invention:—

1. In a two-light lamp, the combination with a forwardly open casing having a perforation in its back, of a partition and socket supporting member inserted and supported in the casing as a unit, the said member comprising in integral formation a horizontal web dividing the casing into two compartments, a vertical web bearing against the back of the casing, and lugs at the front and rear of the horizontal web through which the said member can be secured respectively to the lamp front and the back of the casing; and a pair of sockets carried respectively by the two webs, one socket being projected through the said perforation when the lamp is assembled and the two sockets being disposed for holding lamp bulbs respectively at opposite sides of the horizontal web.

2. In a two-light lamp, the combination with a forwardly open casing having a perforation in its back and with a lamp front, of a combined partition and socket supporting member adapted to be inserted in the casing as a unit; the said member comprising a pair of integral webs each provided with a perforation, one web extending horizontally within the casing substantially from front to back of the casing entirely across the casing and being provided at its front and rear with lugs through which it may be secured respectively to the lamp front and the back of the casing, the other web bearing flatwise against the back of the casing and having its perforation in alinement with the perforation in the back of the casing, a socket carried by the last named web and extending through the perforation in the back of the casing and disposed for holding a lamp bulb at the same side of the first named web as the last named web, a second socket carried by the first named web and disposed for holding a lamp bulb on the other side of the first named web, and a conductor connecting the two sockets, means for securing the said other web to the back of the casing, a conductor leading from the first named socket and disposed for engaging a lamp bulb held by the second socket, and means connecting the conductor with the first named web for supporting the conductor.

3. A two-light lamp comprising a casing having a perforation in its back, a socket-supporting member constructed separately from and mounted within the casing, the said member including a rear portion bearing flatwise against the back of the casing and also including a partition portion transverse to the said back; and two lamp-sockets respectively carried by the two portions of the supporting member and respectively arranged for holding lamps within the casing at opposite sides of the said partition portion, one of the sockets extending through the partition and the other through the said perforation.

Signed at Chicago, Illinois, July 16th, 1923.

EDWARD S. PRESTON.